United States Patent
Vilcot et al.

(10) Patent No.: US 10,787,037 B2
(45) Date of Patent: Sep. 29, 2020

(54) TIRE IN TWO PARTS SUITED TO RETREADING

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Florian Vilcot, Clermont-Ferrand (FR); Jean-Michel Huygue, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 485 days.

(21) Appl. No.: 15/320,558

(22) PCT Filed: Jun. 16, 2015

(86) PCT No.: PCT/IB2015/000968
§ 371 (c)(1),
(2) Date: Dec. 20, 2016

(87) PCT Pub. No.: WO2015/193718
PCT Pub. Date: Dec. 23, 2015

(65) Prior Publication Data
US 2017/0144487 A1    May 25, 2017

(30) Foreign Application Priority Data
Jun. 20, 2014   (FR) ..................................... 14 01395

(51) Int. Cl.
*B60C 11/02* (2006.01)
*B29D 30/56* (2006.01)
(Continued)

(52) U.S. Cl.
CPC .............. *B60C 11/02* (2013.01); *B29D 30/56* (2013.01); *B60C 9/02* (2013.01); *B29K 2009/06* (2013.01); *B29K 2021/003* (2013.01)

(58) Field of Classification Search
CPC ................................. B60C 11/02; B29D 30/56
See application file for complete search history.

(56) References Cited

U.S. PATENT DOCUMENTS 1,341,121 A    5/1920  Gates
1,398,414 A *  11/1921 Brucker ................. B60C 19/00
                                                 152/187
(Continued)

FOREIGN PATENT DOCUMENTS

DE       21 08 221       9/1972
EP     1127909 A1        8/2001
(Continued)

OTHER PUBLICATIONS

Zs. Fodor, et al., "Polyisobutylene-containing block polymers by sequential monomer addition", Polymer Bulletin 29, 697-704 (1992).
(Continued)

*Primary Examiner* — Steven D Maki
(74) *Attorney, Agent, or Firm* — Venable LLP

(57) ABSTRACT

A tire carcass (1) comprises two sidewalls (2) and a crown (3) suitable for receiving, radially externally, a tread (4), the internal surface of the sidewalls and of the crown forming an internal wall (10), also comprising a circumferential tread support surface (6) provided with a layer of thermoplastic elastomer (TPE), the support surface (6) extending from one bead (7) to the other while passing through the sidewalls (2) and the crown (3).

6 Claims, 4 Drawing Sheets

(51) Int. Cl.
  *B60C 9/02*   (2006.01)
  *B29K 9/06*   (2006.01)
  *B29K 21/00*  (2006.01)

(56) References Cited

U.S. PATENT DOCUMENTS

| | | | |
|---|---|---|---|
| 4,946,899 | A | 8/1990 | Kennedy et al. |
| 5,977,238 | A | 11/1999 | Labauze |
| 6,013,718 | A | 1/2000 | Cabioch et al. |
| 6,503,973 | B2 | 1/2003 | Robert et al. |
| 6,815,473 | B2 | 11/2004 | Robert et al. |
| 7,312,264 | B2 | 12/2007 | Gandon-Pain |
| 8,563,098 | B2 | 10/2013 | Abad et al. ............ 428/12 |
| 8,815,034 | B2 | 8/2014 | Koutoku et al. |
| 2001/0036991 | A1 | 11/2001 | Robert et al. |
| 2002/0183436 | A1 | 12/2002 | Robert et al. |
| 2006/0089445 | A1 | 4/2006 | Gandon-Pain |
| 2009/0159165 | A1* | 6/2009 | Herberger, Sr. ...... B29D 30/56 152/209.1 |
| 2009/0183812 | A1 | 7/2009 | Hoffman et al. ........... 152/450 |
| 2011/0056603 | A1 | 3/2011 | Koutoku et al. |
| 2012/0156400 | A1 | 6/2012 | Abad et al. ............. 428/12 |
| 2015/0034226 | A1 | 2/2015 | Abad et al. .............. 152/450 |
| 2015/0034230 | A1* | 2/2015 | Abad .................... B29D 30/54 156/96 |
| 2017/0136824 | A1* | 5/2017 | Huyghe ................ B60C 11/02 |
| 2017/0144398 | A1 | 5/2017 | Merino Lopez et al. |
| 2017/0157987 | A1* | 6/2017 | Huyghe ................ B60C 11/02 |

FOREIGN PATENT DOCUMENTS

| | | |
|---|---|---|
| FR | 2740778 A1 | 5/1997 |
| FR | 2765882 A1 | 1/1999 |
| FR | 2 948 320 A1 | 1/2011 |
| FR | 2 988 728 A1 | 10/2013 |
| FR | 2988644 A1 * | 10/2013 |
| GB | 869752 A * | 6/1961 |
| JP | 2011-42091 A | 3/2011 |
| JP | 2011-42229 A | 3/2011 |
| WO | 01/92402 A1 | 12/2001 |
| WO | 2004/096865 A1 | 11/2004 |
| WO | 2008/006185 A1 | 1/2008 |
| WO | 2009/139449 A1 | 11/2009 |

OTHER PUBLICATIONS

G. Kaszas, et al., "New Thermoplastic Elastomers of Rubbery Polyisobutylene and Glassy Cyclopolyisoprene Segments", J. Applied Polymer Sci., vol. 39, 110-144 (1990).

J.P. Kennedy, et al., "Polyisobutylene-Containing Block Copolymers by Sequential Monomer Addition", Macromolecules 1991, 24, 6572-6577.

J.E. Puskas, et al., "New Transparent Flexible UV-Cured Films from Polyisobutylene-Polyisoprene Block Polymers", J. Macromol. Sci.—Chem., A28(1). pp. 65-80 (1991).

J.E. Puskas, et al., "Polyisobutylene-Containing Block Polymers by Sequential Monomer Addition", J. Polymer Sci.: Part A: Polymer Chemistry, vol. 30, 41-48 (1992).

P.S. Tucker, et al., "Thermal, Mechanical, and Morphological Analyses of Poly(2,6-dimethyl-1,4-phenylene oxide)/ Styrene-Butadiene-Styrene Blends", Macromolecules 1988, 21, 1678-1685.

* cited by examiner

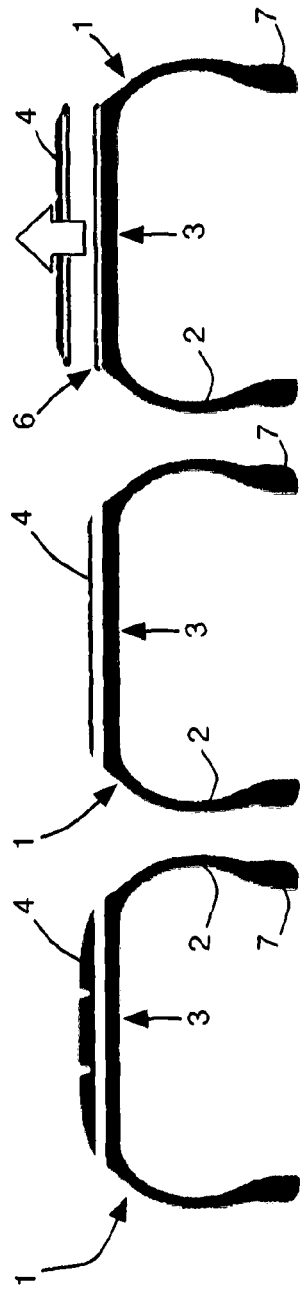 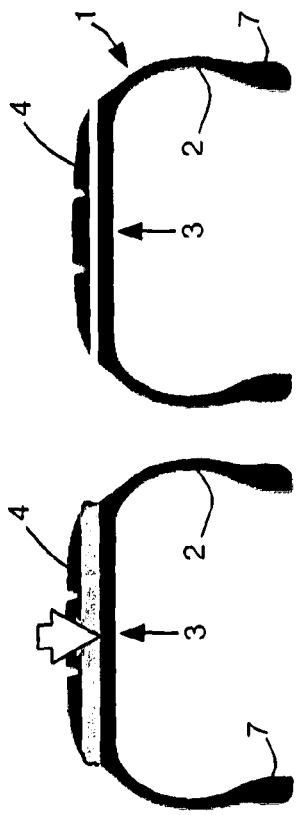

US 10,787,037 B2

TIRE IN TWO PARTS SUITED TO RETREADING

TECHNICAL FIELD OF THE INVENTION

The present invention relates to a tyre carcass comprising two sidewalls and a crown suitable for receiving, radially externally, a tread, the internal surface of the sidewalls and of the crown forming an internal wall.

STATE OF THE PRIOR ART

Patent application WO 2009/139449 A1 proposes a radial tyre which comprises at least one carcass layer which connects the right and left bead parts, a belt layer positioned on the external periphery of the carcass layer and a tread positioned on the external periphery of the belt layer, in which the tread has a layered structure comprising a tread-surface-side rubber layer, a belt-layer-side rubber layer and a thermoplastic film layer interposed therebetween which is constituted of a thermoplastic resin or a thermoplastic elastomer composition obtained by blending a thermoplastic resin with an elastomer. The invention also relates to a process for the manufacture of a retreaded tyre from the radial tyre, the tread of which is worn out, the process comprising the softening of the thermoplastic film layer by heating, the separation and removal of the tread-surface-side rubber layer to form a tyre casing and subsequently the adhesive bonding of a fresh tread-surface-side rubber layer to the tyre casing.

The document JP 2011042091 proposes to reduce the production cost of a tyre using a thermoplastic material having a tyre skeleton member. The tyre skeleton member is formed using a thermoplastic material, and cushion rubber (nonvulcanized rubber) is positioned on the peripheral surface of the skeleton member. The vulcanized or semi-vulcanized tread rubber is arranged outside in the tyre diameter of direction of the cushion rubber. The periphery of the tread is covered with a belt-shaped restraining member to push the tread to the side of the tyre skeleton member to constitute a temporarily assembled article. The assembled article is temporarily held in a container, and the vulcanization is carried out by heating the inside of the container, so that the tread rubber is adhered to the tyre member.

Patent Application JP 2011042229 proposes to guarantee a uniform and stable joint surface on a joint part of a tyre skeleton member formed of a thermoplastic material with a tread.

The document FR 2 948 320 relates to a tyre provided with a layer airtight to the inflating gases. This layer comprises an elastomer composition comprising at least, as sole elastomer or as predominant elastomer by weight, a thermoplastic styrene elastomer ("TPS") and a lamellar filler. This lamellar filler has an equivalent diameter of between 20 and 45 micrometres and a form factor of greater than 65.

Application U.S. Pat. No. 1,341,121 describes a process used in the event of puncturing of a casing which comprises a specific cement applied from a portion of a member to the portion of another member by deforming a part of the first member and by applying another portion to the other member while it is deformed.

The document DE2108221 relates to the outer lining of a tyre carcass which is held in position by mechanical incorporation of flexible steel rings of smaller diameter than that of the carcass. These rings have a lug-shaped section at their ends, and fit into a groove in the carcass.

The document FR 2 988 728 relates to a radial tyre for a motor vehicle, comprising in particular a crown reinforcement positioned circumferentially between the radially outer part of the tread and the carcass reinforcement. A radially inner elastomer layer referred to as underlayer, having a formulation different from the formulation of the radially outer part of the tread, is itself positioned circumferentially between the radially outer part of the tread and the carcass reinforcement, The said underlayer comprises at least one thermoplastic elastomer, the said thermoplastic elastomer being a block copolymer comprising at least one elastomer block and at least one thermoplastic block, the total content of thermoplastic elastomer being within a range varying from 65 to 100 phr (parts by weight per hundred parts of elastomer).

Application WO2008006185 describes a universal support for a tyre tread, in the form of a finished part intended for an application tailored for any type of tread, formed of beads, sidewalls surrounding a flat region surmounted by a bent region, the tread having a base layer coated with a layer of thermoplastic elastomer compatible with another layer exhibiting self-adhesive characteristics and which is protected against oxidation and different contaminants by a removable plastic film.

These different systems involve complex and expensive processes and provide uncertain results with regard to the characteristics of adhesion between the tread and the carcass.

The invention provides various technical means for overcoming these various disadvantages.

SUMMARY OF THE INVENTION

First of all, a first object of the invention is to provide a device or a process which makes it possible to simplify the retreading and tread separation operations, in particular for use with tyres intended for passenger vehicles or private vehicles.

Another object of the invention is to provide a device or process which makes it possible to carry out a tread separation operation with great accuracy and with good repeatability.

Yet another object of the invention is to provide a device or process which makes it possible to carry out retreading and tread separation operations on non-industrial sites, for example petrol stations where tyres are put on and taken off.

Yet another object of the invention is to provide a device or process which makes it possible to carry out tread separation and retreading operations which promote the production of retreaded tyres for which the characteristics of adhesion between the tread and the carcass are particularly favourable, stable and lasting.

To do this, the invention provides a tyre carcass comprising two sidewalls and a crown suitable for receiving, radially externally, a tread, the internal surface of the sidewalls and of the crown forming an internal wall. The carcass also comprises a circumferential tread support surface which extends from one bead to the other while passing through the sidewalls and the crown, this tread support surface being covered with a layer of thermoplastic elastomer (TPE).

According to an advantageous embodiment, the TPE/elastomer mixture interface is cocrosslinked, without the TPE layer being crosslinked throughout its body. This characteristic makes it possible for the TPE/elastomer mixture interface to be particularly resistant and durable while retaining the properties intrinsic to the TPE layer. This is possible owing to the fact that the carcass is obtained by joint moulding and vulcanization of a carcass elastomer mixture comprising crosslinking agents and of the adjacent thermoplastic elastomer layer devoid of crosslinking agents, the moulding and the crosslinking making possible a cocrosslinking of the TPE/elastomer mixture interface without the TPE layer being crosslinked throughout its body.

Such an architecture makes it possible to replace all of the carcass of a tyre. This is particularly advantageous if the sidewalls have been worn out or if the marking of the sidewalls has to be touched up or modified.

According to an advantageous embodiment, the layer of thermoplastic elastomer (TPE) is crosslinked with the adjacent layer of crown rubber mixture.

The cocrosslinking of the TPE layer with the rubber mixtures of the tyre by vulcanization has shown an extremely positive and robust effect. The crosslinking is carried out with the agents present in the tyre (sulphur and accelerator which are customary in the rubber mixtures of tyres). These agents are absent from the TPE layer when the preform of the tyre is produced, before curing. The slight migration of these agents during the curing makes possible crosslinking with sulphur in the TPE/rubber interface and makes it possible for the TPE product not to be crosslinked throughout its body.

According to another advantageous embodiment, the layer of thermoplastic elastomer (TPE) is located radially externally with respect to the carcass.

Advantageously, the layer of thermoplastic elastomer (TPE) is covered with a removable protective membrane.

Advantageously again, the layer of thermoplastic elastomer (TPE) consists of SBS or SBS/PPE.

Advantageously again, the layer of thermoplastic elastomer (TPE) comprises a thickness of between 10 μm and 1 mm and more preferably between 10 μm and 200 μm and more preferably still between 10 μm and 80 μm.

Advantageously again, the carcass comprises a carcass reinforcing structure.

The invention also provides a tyre ring, provided with a substantially central tread region comprising an inner face and an outer face, two sidewall regions, on each side of the tread region, comprising a supporting surface covered with a layer of thermoplastic elastomer (TPE), the supporting surface extending from one bead to the other while passing through the sidewalls and the tread region.

According to an advantageous embodiment, the TPE/elastomer mixture interface is cocrosslinked, without the TPE layer being crosslinked throughout its body. This characteristic makes it possible for the TPE/elastomer mixture interface to be particularly resistant and durable while retaining the properties intrinsic to the TPE layer. This is possible owing to the fact that the ring is obtained by joint moulding and vulcanization of a ring elastomer mixture comprising crosslinking agents and of the adjacent thermoplastic elastomer layer devoid of crosslinking agents, the moulding and the crosslinking making possible a cocrosslinking of the TPE/elastomer mixture interface without the TPE layer being crosslinked throughout its body.

Such an architecture makes it possible to replace all of the visible part of a tyre. This is particularly advantageous if the sidewalls have been worn out or if the marking of the sidewalls has to be touched up or modified.

According to an advantageous embodiment, the thermoplastic elastomer (TPE) layer is crosslinked with the adjacent layer of carcass rubber mixture.

The cocrosslinking of the TPE layer with the rubber mixtures of the tyre by vulcanization has shown an extremely positive and robust effect. The crosslinking is carried out with the agents present in the tyre (sulphur and accelerator which are customary in the rubber mixtures of tyres). These agents are absent from the TPE layer when the preform of the tyre is produced, before curing. The slight migration of these agents during the curing makes possible crosslinking with sulphur in the TPE/rubber interface and makes it possible for the TPE product not to be crosslinked throughout its body.

According to another advantageous embodiment, the layer of thermoplastic elastomer (TPE) is located radially internally when the ring is shaped according to a circumferential profile suited to the form of a tyre.

Advantageously, the layer of thermoplastic elastomer (TPE) is covered with a removable protective membrane.

Advantageously again, the layer of thermoplastic elastomer (TPE) consists of SBS or SBS/PPE.

Advantageously again, the layer of thermoplastic elastomer (TPE) comprises a thickness of between 10 μm and 1 mm and more preferably between 10 μm and 200 μm and more preferably still between 10 μm and 80 μm.

According to an advantageous embodiment, the layer of thermoplastic elastomer (TPE) of the carcass and the layer of thermoplastic elastomer (TPE) of the ring consist of identical materials.

Finally, the invention provides a tyre consisting of a carcass as described above, on which a tyre ring is positioned.

According to an advantageous embodiment, the ring is attached to the carcass by thermal bonding.

According to another advantageous embodiment, the ring is attached to the carcass in removable fashion (for example removable by means of heat energy applied at the interface between the two elements to be disassembled).

DESCRIPTION OF THE FIGURES

All the implementational details are given in the description which follows, supplemented by FIGS. 1 to 11, which are presented solely for the purposes of nonlimiting examples and in which:

FIGS. 1A to 1E diagrammatically illustrate the concept employed in the context of the present invention, with a carcass and a tread forming a fresh tyre in 1A, a tyre with a worn tread in FIG. 1B, the removal (tread separation) of the worn tread in FIG. 1C, the fitting of a new tread (retreading) in FIG. 1D and the retreaded tyre in FIG. 1E;

DETAILED DESCRIPTION OF THE INVENTION

Rapid Retreading System

Figure 2:
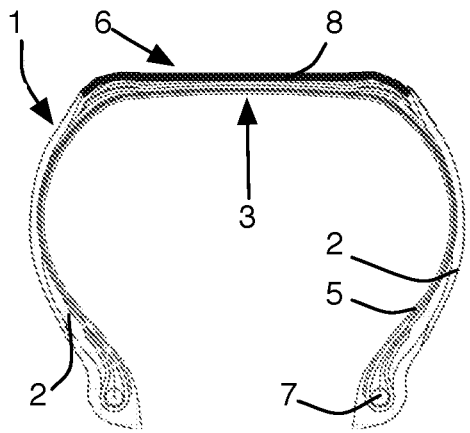
FIG. 2 illustrates an example of a carcass provided with a layer of thermoplastic elastomer at the interface region with the tread.

FIGS. 1A to 1E diagrammatically illustrate the basic principle of the device and of the process employed in the context of the present invention, which consist in having available, in the tyre in the fresh state (FIG. 1A), a layer of thermoplastic elastomer material (TPE) specifically provided for the tread separation and retreading operations. By virtue of this novel architecture, the latter operations can now be carried out much more rapidly and easily when necessary on a worn tyre (FIGS. 1B and 1C).

This is because, once the tyre is worn out, the following operations can be easily and rapidly carried out:

the TPE layer is softened by the effect of heat, thus making it very easy to separate the tread after it has been worn out (FIG. 1C);

once the tread has been separated from the remainder of the tyre, the carcass obtained has available, at the surface, a TPE layer specifically appropriate for receiving a new tread;

the replacement of the tread (FIGS. 1D and 1E) is carried out by adding a new tread which itself also comprises a TPE layer. By heating the assembly and by keeping the tread in contact with the carcass with a certain pressure (FIG. 1D), the tread remains adhesively bonded to the carcass, with a strong and durable adhesion, without use of adhesive since the adherence provided by the thermal bonding confers a highly advantageous result.

The main advantages of this architecture and of this process are:

the speed of the operations, which do not require carding in order to remove the tread or vulcanization after the fitting of the new tread, as is customary with current retreading systems;

the great accuracy of the tread removal operation, as a result of the separation region specifically provided and delimited right from the design of the tyre. This precise delimitation makes it possible to control and to decrease the amount of rubber mixture (or rubber) left on the carcass. The latter aspect is very favourable for the endurance of the tyre and limits the consumption of fuel;

carrying out the tread removal and retreading operations at the point of sale and/or of replacement of the tyres renders obsolete the management of stocks and the logistics which are inherent in the monitoring of carcasses;

the tyre comprising a TPE layer is difficult to remove from the mould with a conventional process. This is because the TPE layer is softened in the curing press and the removal from the mould comprising the pattern of the tread exerts a radial stress on the tread which can bring about points of peeling of the latter. One possible solution consists in cooling the tyre in the press before removal from the mould. This action is highly unfavourable from the energy viewpoint and is not very realistic industrially. The solution of the invention makes it possible to overcome this disadvantage.

Thus, the design of the tyre according to the invention is provided in two parts: a part denoted by the term "carcass" and another denoted by the term "tread".

i) Carcass for Producing a Fresh Tyre or Tyre with Pre-Used Carcass

The tyre is manufactured in two parts: a carcass and a tread. A carcass is a tyre which does not comprise a tread. It is useful to consider the carcasses at two moments in the life of the tyre, either with a fresh tyre or with a tyre having a worn tread.

These two parts are assembled to produce the final tyre. The carcass used is either newly manufactured or obtained by separation of the tread from a used tyre having a worn tread. This operation can be carried out after wear of the tread in order to place a new tread on the carcass obtained by tread separation.

In both cases, the carcass 1 comprises beads 7, sidewalls 2 and a crown region 3 which makes it possible to connect the two sidewalls 2 via their radially external portion. The carcass 1 advantageously comprises one or more carcass reinforcements 5 and crown reinforcements, an optional 0° reinforcer, like a standard tyre.

However, it does not have a tread. Instead of and in place of the latter, the radially external region intended to come into contact with a tread is provided with a layer of thermoplastic elastomer (TPE) material as described later.

The TPE layer can have a thickness of the order of 0.1 to 1 mm. Advantageously, this layer has a reduced thickness, between 10 and 200 µm and more advantageously still between 10 and 80 µm. Excellent endurance results have been obtained during internal tests with a TPE layer between 20 and 50 µm.

The materials successfully used are SBS/PPE and methylstyrene.

The carcass is advantageously manufactured by moulding in a curing/vulcanization press. The press can be cooled in order to promote the formation of a defect-free TPE layer.

Advantageously, between the carcass preform and its insertion into the curing mould, a thermoplastic insert, resistant to the curing temperature, is introduced. Use is advantageously made (without this listing being limiting) of materials such as: ETFE (Ethyltetrafluoroethylene), PTFE (Polytetrafluoroethylene), FEP (Fluorinated ethylene propylene), PFA (Perfluoroalkoxy), PMP (Polymethylpentene) or PA (Polyamide).

The films used advantageously have a thickness of less than 100 µm and more preferably of between 25 and 50 µm.

In order to promote the moulding, while avoiding in particular the formation of gas bubbles at the surface, it is advantageous to provide a rough surface state during the moulding.

Such a surface state can be obtained, for example:

with elements engraved in the mould, such as grooves, with a depth of less than 0.5 mm and preferably of less than 0.3 mm. Advantageously, the channels are connected together so as to form a network;

by virtue of the use of a mould of velvet type;

by virtue of the use of a fabric in contact with the surface of the mould.

The tread support surface obtained by means of this architecture and of this process exhibits a surface roughness which is favourable to the bonding between the carcass and the tread.

ii) Tread (Architecture and Moulding):

The tread 4 comprises a layer of thermoplastic elastomer (TPE) 8 at its radially inner surface. This makes it possible to carry out an assembling with a carcass 1 itself also comprising a layer of thermoplastic elastomer (TPE) on its radially external surface 6.

In order to carry out the moulding while preventing the TPE from adhering to the walls of the mould, a nonstick film 12 is positioned in the mould. Use is advantageously made of thermoplastic films which are resistant to the curing temperature. For the tyres of passenger vehicles, the melting or softening point of the plastic has to be greater than 180° C. and preferably greater than 200° C. Use is advantageously made (without this listing being limiting) of the materials such as: ETFE (Ethyltetrafluoroethylene), PTFE (Polytetrafluoroethylene), FEP (Fluorinated ethylene propylene), PFA (Perfluoroalkoxy), PMP (Polymethylpentene) or PA (Polyamide).

The films used advantageously have a thickness of less than 100 μm and more preferably of between 25 and 50 μm.

The moulding of the tread 4 is carried out with a radially external mould element 10 which exhibits the tread patterns of the tread and a radially internal mould element 11. The radially internal mould 11 is intended to mould the surface of the TPE which is (completely or partially) in contact with the TPE region of the carcass in order to produce thermal bonding (often denoted hot melt bonding).

Just as for the carcass, in order to promote the moulding, while avoiding in particular the formation of gas bubbles at the surface, it is advantageous to give a rough surface state during the moulding. Such a surface state can be obtained, for example:

with elements engraved in the mould, such as grooves, with a depth of less than 0.5 mm and preferably of less than 0.3 mm. The mould with the surface grooves can be Teflon-coated. Advantageously, the channels are connected together so as to form a network;

by virtue of the use of a mould of velvet type;

by virtue of the use of a fabric in contact with the surface of the mould.

The tread obtained exhibits a surface roughness which is favourable to the bonding between the carcass and the tread.

Figure 7A:
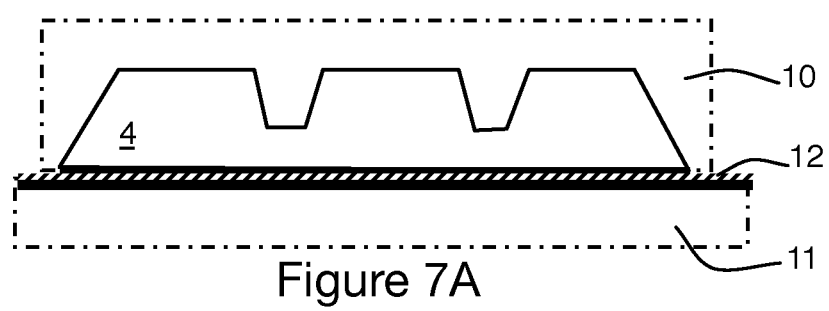
FIGS. 7A and 7B diagrammatically show the mode of moulding a tread as illustrated in FIG. 6.

FIG. 7A illustrates an implementational example in which a film 12 is positioned between the mould and the TPE layer.

Figure 7B:
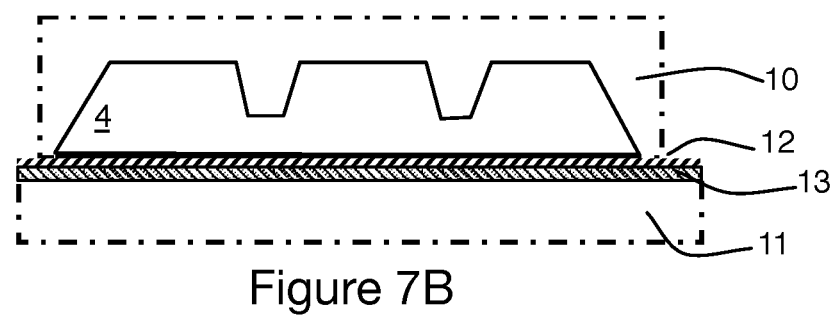
Figure 8A:
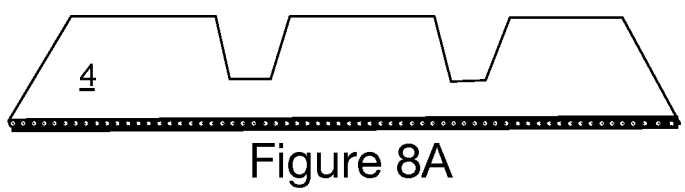
FIGS. 8A and 8B diagrammatically show alternative forms of treads with the circumferential reinforcers which are provided in the layer of TPE (FIG. 8A) or in the layer of rubber material (FIG. 8B)
Figure 8B:
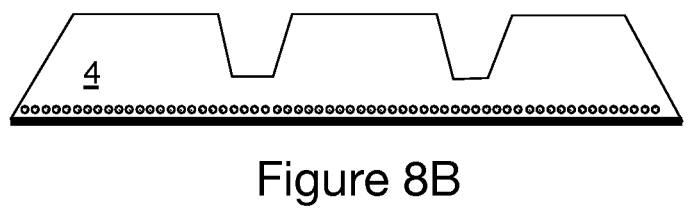

FIG. 7B illustrates an alternative form in which a fabric 13 is also provided, advantageously under the film 12. The fabric can be made of PA, polyester or other material and advantageously have a thickness of between 0.1 and 1 mm.

In an alternative form, cycles of fall in pressure are carried out during the moulding in order to promote the degassing and thus promote a better moulding quality.

Figure 3:
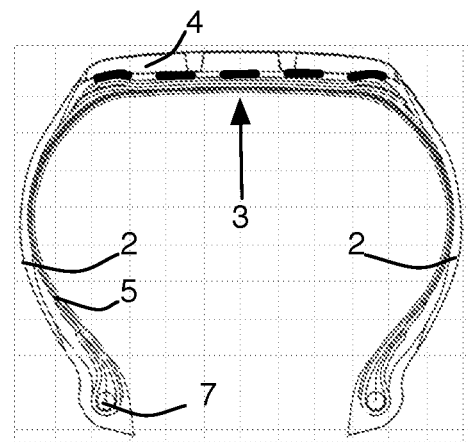
FIG. 3 diagrammatically shows a tyre in two parts according to the invention.

In another alternative form, the use of the preceding arrangement (with fabric or grooved mould) makes it possible to produce a moulding of good quality while reducing the cycles of fall in pressure.

iii) Alternative Embodiments with the Positioning of the Carcass/Tread Separation Region In the implementational examples of FIGS. 2 and 3, the respective TPE layers of the carcass and tread are provided so that the tread is devoid of reinforcers (FIG. 3), the latter being provided in the carcass (FIG. 2).

Figure 4:
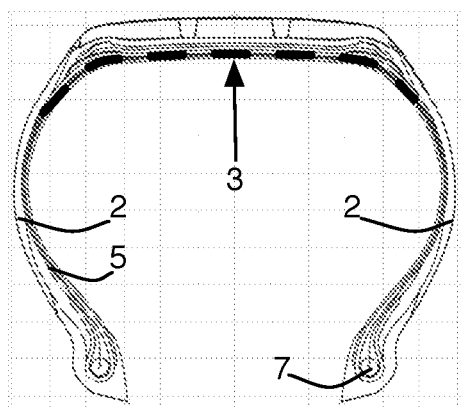
FIG. 4 shows an alternative architectural form of the tyre of FIG. 3.
Figure 5A:
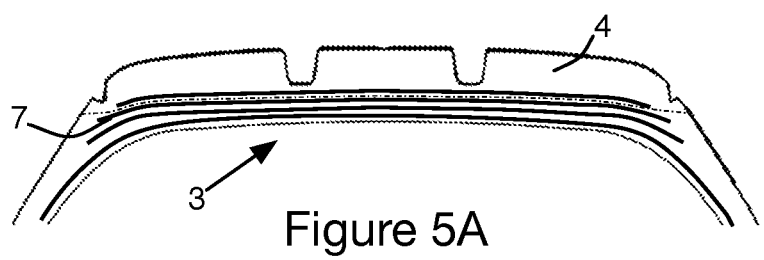
FIGS. 5A and 5B diagrammatically exhibit examples of architecture of crown regions with various positions of the reinforcers.
Figure 5B:
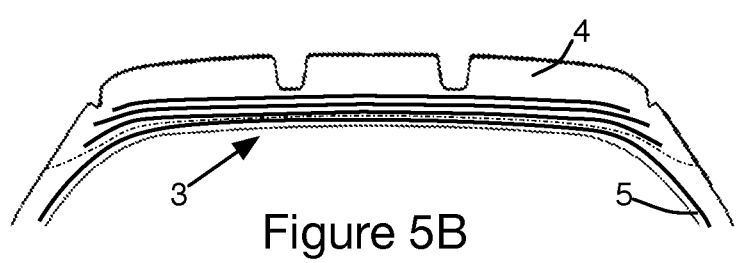
Figure 6:
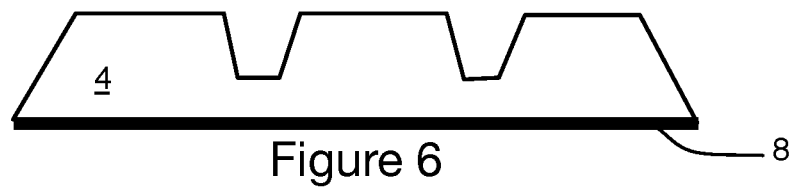
FIG. 6 illustrates a diagrammatic representation of a tread according to the invention.

FIGS. 4, 5A and 5B illustrate various alternative forms in which the boundary between these two elements is provided according to other architectures. For example, in FIG. 4, the carcass comprises the carcass reinforcers provided from one bead to the other, and the tread houses the other reinforcers, such as the crown reinforcers. The examples of FIGS. 5A and 5B illustrate other alternative architectural forms in which the crown reinforcers are distributed between the tread and the carcass (FIG. 5A) or concentrated in the tread (FIG. 5B). These various alternative forms provide various advantages depending on the performances desired, on the one hand, but also from the viewpoint of the possibilities of controlling the good quality of the reinforcers of the carcass before an optional retreading. Furthermore, in the case where the reinforcers are concentrated in the tread, their removal before retreading makes it possible to avoid any prolonged use of reinforcers which have undergone possible oxidation.

In another alternative form using a double layer of circumferential reinforcers, the boundary is advantageously located between these two layers of reinforcers.

iv) Embodiment with Tread in the Ring Form

Figure 9A:
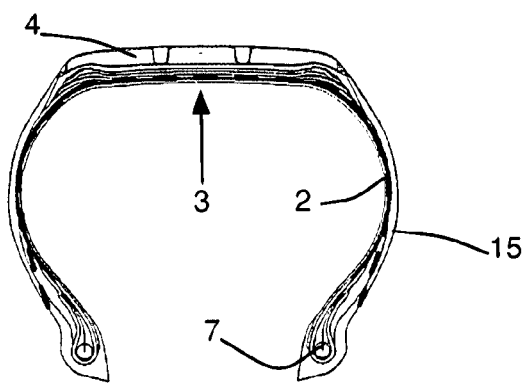
FIGS. 9A and 9B diagrammatically show an alternative embodiment in which the removable portion extends from one bead to the other, forming a ring.
Figure 9B:
Figure 10:
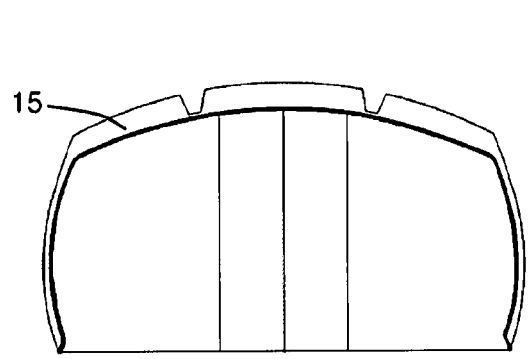
FIG. 10 is a diagram illustrating the moulding of the ring illustrated in FIGS. 9A and 9B with a mould advantageously in several sections in order to facilitate removal from the mould.
Figure 11:
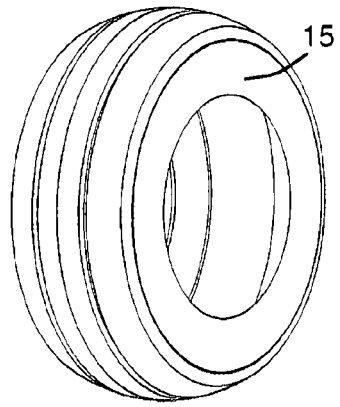
FIG. 11 diagrammatically illustrates an example of a moulded ring seen in perspective.

FIGS. 9 to 11 are diagrammatic representations of another embodiment of the invention in which the boundary between the tread 4 and the carcass 1 extends from one sidewall 2 to the other, or from one bead 7 to the other, forming a ring 15 as shown in the example of FIG. 9A. FIG. 10 shows an implementational example of an extended tread or ring 15 mould. In order to promote removal from the mould, this mould is advantageously made of several sections which can be dismantled with respect to one another, as shown in FIG. 10.

The materials employed, the precautions related to the moulding, such as the use of a nonstick film 12 and/or a fabric 13, apply similarly to these embodiments.

FIG. 11 is a diagrammatic representation in perspective of a ring ready for twinning with a carcass. The inner region, provided with TPE, makes possible the efficient and certain bonding of the two elements, similarly to what was described beforehand for the preceding embodiments with a tread restricted to the crown region.

v) Materials

The term "phr" means, within the meaning of the present patent application, parts by weight per hundred parts of elastomer, thermoplastic and non-thermoplastic mixed together. Within the meaning of the present invention, thermoplastic elastomers (TPEs) are included among the elastomers.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

1. Composition of the Underlayer

The tyre according to the invention has the essential characteristic of being provided with an elastomer layer, referred to as "underlayer", having a formulation different from the patterned outer portion of the tread, the said underlayer comprising at least one thermoplastic elastomer, the said thermoplastic elastomer being a block copolymer comprising at least one elastomer block and at least one thermoplastic block, and the total content of thermoplastic elastomer being within a range varying from 65 to 100 phr (parts by weight per hundred parts of elastomer).

1.1. Thermoplastic Elastomer (TPE)

Thermoplastic elastomers (abbreviated to "TPEs") have a structure intermediate between thermoplastic polymers and elastomers. These are block copolymers composed of rigid thermoplastic blocks connected via flexible elastomer blocks.

The thermoplastic elastomer used for the implementation of the invention is a block copolymer, the chemical nature of the thermoplastic and elastomer blocks of which can vary.

1.1.1. Structure of the TPE

The number-average molecular weight (denoted Mn) of the TPE is preferably between 30 000 and 500 000 g/mol, more preferably between 40 000 and 400 000 g/mol. Below the minima indicated, there is a risk of the cohesion between the elastomer chains of the TPE being affected, in particular due to its possible dilution (in the presence of an extending oil); furthermore, there is a risk of an increase in the working temperature affecting the mechanical properties, in particular the properties at break, with the consequence of a reduced "hot" performance. Furthermore, an excessively high Mn weight can be damaging to the implementation. Thus, it has been found that a value within a range from 50 000 to 300 000 g/mol is particularly well suited, in particular to use of the TPE in a tyre underlayer composition.

The number-average molecular weight (Mn) of the TPE elastomer is determined, in a known manner, by steric exclusion chromatography (SEC). For example, in the case of styrene thermoplastic elastomers, the sample is dissolved beforehand in tetrahydrofuran at a concentration of approximately 1 g/l and then the solution is filtered through a filter with a porosity of 0.45 μm before injection. The apparatus used is a Waters Alliance chromatographic line. The elution solvent is tetrahydrofuran, the flow rate is 0.7 ml/min, the temperature of the system is 35° C. and the analytical time is 90 min. A set of four Waters columns in series, with the Styragel tradenames (HMW7, HMW6E and two HT6E), is used. The injected volume of the solution of the polymer sample is 100 μl. The detector is a Waters 2410 differential refractometer and its associated software, for making use of the chromatographic data, is the Waters Millennium system. The calculated average molar masses are relative to a calibration curve produced with polystyrene standards. The conditions can be adjusted by a person skilled in the art.

The value of the polydispersity index PI (reminder: PI=Mw/Mn, with Mw the weight-average molecular weight and Mn the number-average molecular weight) of the TPE is preferably less than 3, more preferably less than 2 and more preferably still less than 1.5.

In the present patent application, when reference is made to the glass transition temperature of the TPE, it concerns the Tg relative to the elastomer block. The TPE preferably exhibits a glass transition temperature ("Tg") which is preferably less than or equal to 25° C., more preferably less than or equal to 10° C. A Tg value greater than these minima can reduce the performances of the underlayer when used at very low temperature; for such a use, the Tg of the TPE is more preferably still less than or equal to −10° C. Preferably again, the Tg of the TPE is greater than −100° C.

In a known way, TPEs exhibit two glass transition temperature peaks (Tg, measured according to ASTM D3418), the lowest temperature being relative to the elastomer part of the TPE and the highest temperature being relative to the thermoplastic part of the TPE. Thus, the flexible blocks of the TPEs are defined by a Tg which is less than ambient temperature (25° C.), while the rigid blocks have a Tg which is greater than 80° C.

In order to be both elastomeric and thermoplastic in nature, the TPE has to be provided with blocks which are sufficiently incompatible (that is to say, different as a result of their respective weights, their respective polarities or their respective Tg values) to retain their own properties of elastomer block or thermoplastic block.

The TPEs can be copolymers with a small number of blocks (less than 5, typically 2 or 3), in which case these blocks preferably have high weights of greater than 15 000 g/mol. These TPEs can, for example, be diblock copolymers, comprising a thermoplastic block and an elastomer block. They are often also triblock elastomers with two rigid segments connected by one flexible segment. The rigid and flexible segments can be positioned linearly, or in a star or branched configuration. Typically, each of these segments or blocks often comprises a minimum of more than 5, generally of more than 10, base units (for example, styrene units and butadiene units for a styrene/butadiene/styrene block copolymer).

The TPEs can also comprise a large number of smaller blocks (more than 30, typically from 50 to 500), in which case these blocks preferably have relatively low weights, for example from 500 to 5000 g/mol; these TPEs will subsequently be referred to as multiblock TPEs and are an elastomer block/thermoplastic block series.

According to a first alternative form, the TPE is provided in a linear form. For example, the TPE is a diblock copolymer: thermoplastic block/elastomer block. The TPE can also be a triblock copolymer: thermoplastic block/elastomer block/thermoplastic block, that is to say a central elastomer block and two terminal thermoplastic blocks, at each of the two ends of the elastomer block. Equally, the multiblock TPE can be a linear series of elastomer blocks/thermoplastic blocks.

According to another alternative form of the invention, the TPE of use for the requirements of the invention is provided in a star-branched form comprising at least three branches. For example, the TPE can then be composed of a star-branched elastomer block comprising at least three branches and of a thermoplastic block located at the end of each of the branches of the elastomer block. The number of branches of the central elastomer can vary, for example, from 3 to 12 and preferably from 3 to 6.

According to another alternative form of the invention, the TPE is provided in a branched or dendrimer form. The TPE can then be composed of a branched or dendrimer elastomer block and of a thermoplastic block located at the end of the branches of the dendrimer elastomer block.

1.1.2. Nature of the Elastomer Blocks

The elastomer blocks of the TPE for the requirements of the invention can be any elastomer known to a person skilled in the art. They generally have a Tg of less than 25° C., preferably of less than 10° C., more preferably of less than 0° C. and very preferably of less than −10° C. Preferably again, the Tg of the elastomer block of the TPE is greater than −100° C.

For the elastomer blocks comprising a carbon-based chain, if the elastomer part of the TPE does not comprise an ethylenic unsaturation, it will be referred to as a saturated elastomer block. If the elastomer block of the TPE comprises ethylenic unsaturations (that is to say, carbon-carbon double bonds), it will then be referred to as an unsaturated or diene elastomer block.

A saturated elastomer block is composed of a sequence of polymer obtained by the polymerization of at least one (that is to say, one or more) ethylenic monomer, that is to say, a monomer comprising a carbon-carbon double bond. Mention may be made, among the blocks resulting from these ethylenic monomers, of polyalkylene blocks, such as ethylene/propylene or ethylene/butylene random copolymers. These saturated elastomer blocks can also be obtained by hydrogenation of unsaturated elastomer blocks. They can also be aliphatic blocks resulting from the family of the polyethers, polyesters or polycarbonates.

In the case of saturated elastomer blocks, this elastomer block of the TPE is preferably predominantly composed of ethylenic units. Predominantly is understood to mean the highest content by weight of ethylenic monomer, with respect to the total weight of the elastomer block, and preferably a content by weight of more than 50%, more preferably of more than 75% and more preferably still of more than 85%.

Conjugated $C_4$-$C_{14}$ dienes can be copolymerized with the ethylenic monomers. They are, in this case, random copolymers. Preferably, these conjugated dienes are chosen from isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene or their mixture. More preferably, the conjugated diene is chosen from butadiene or isoprene or a mixture comprising butadiene and isoprene.

In the case of unsaturated elastomer blocks, this elastomer block of the TPE is preferably predominantly composed of a diene elastomer part. Predominantly is understood to mean the highest content by weight of diene monomer, with respect to the total weight of the elastomer block, and preferably a content by weight of more than 50%, more preferably of more than 75% and more preferably still of more than 85%. Alternatively, the unsaturation of the unsaturated elastomer block can originate from a monomer comprising a double bond and an unsaturation of cyclic type; this is the case, for example, in polynorbonene.

Preferably, conjugated $C_4$-$C_{14}$ dienes can be polymerized or copolymerized in order to form a diene elastomer block. Preferably, these conjugated dienes are chosen from isoprene, butadiene, piperylene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,5-dimethyl-1,3-pentadiene, 2-methyl-1,4-pentadiene, 1,3-hexadiene, 2-methyl-1,3-hexadiene, 2-methyl-1,5-hexadiene, 3-methyl-1,3-hexadiene, 4-methyl-1,3-hexadiene, 5-methyl-1,3-hexadiene, 2,5-dimethyl-1,3-hexadiene, 2,5-dimethyl-2,4-hexadiene, 2-neopentyl-1,3-butadiene, 1,3-cyclopentadiene, methylcyclopentadiene, 2-methyl-1,6-heptadiene, 1,3-cyclohexadiene, 1-vinyl-1,3-cyclohexadiene or their mixture. More preferably, the conjugated diene is isoprene or butadiene or a mixture comprising isoprene and/or butadiene.

According to an alternative form, the monomers polymerized in order to form the elastomer part of the TPE can be randomly copolymerized with at least one other monomer, so as to form an elastomer block. According to this alternative form, the molar fraction of polymerized monomer, other than an ethylenic monomer, with respect to the total number of units of the elastomer block, has to be such that this block retains its elastomer properties. Advantageously, the molar fraction of this other comonomer can range from 0% to 50%, more preferably from 0% to 45% and more preferably still from 0% to 40%.

By way of illustration, this other monomer capable of copolymerizing with the first monomer can be chosen from ethylenic monomers as defined above (for example ethylene), diene monomers, more particularly the conjugated diene monomers having from 4 to 14 carbon atoms as defined above (for example butadiene), monomers of vinylaromatic type having from 8 to 20 carbon atoms as defined above, or also a monomer such as vinyl acetate may be involved.

When the comonomer is of vinylaromatic type, it advantageously represents a fraction of units, with regard to the total number of units of the thermoplastic block, from 0% to 50%, preferably ranging from 0% to 45% and more preferably still ranging from 0% to 40%. The styrene monomers mentioned above, namely methylstyrenes, para(tert-butyl) styrene, chlorostyrenes, bromostyrenes, fluorostyrenes or also para-hydroxystyrene, are suitable in particular as vinylaromatic compounds. Preferably, the comonomer of vinylaromatic type is styrene.

According to a preferred embodiment of the invention, the elastomer blocks of the TPE exhibit, in total, a number-average molecular weight (Mn) ranging from 25 000 g/mol to 350 000 g/mol, preferably from 35 000 g/mol to 250 000 g/mol, so as to confer, on the TPE, good elastomeric properties and a mechanical strength which is sufficient and compatible with the use as tyre underlayer.

The elastomer block can also be a block comprising several types of ethylenic, diene or styrene monomers as defined above.

The elastomer block can also be composed of several elastomer blocks as defined above.

1.1.3. Nature of the Thermoplastic Blocks

Use will be made, for the definition of the thermoplastic blocks, of the characteristic of glass transition temperature (Tg) of the rigid thermoplastic block. This characteristic is well known to a person skilled in the art. It makes it possible in particular to choose the industrial processing (transformation) temperature. In the case of an amorphous polymer (or polymer block), the processing temperature is chosen to be substantially greater than the Tg of the thermoplastic block. In the specific case of a semicrystalline polymer (or polymer block), a melting point may be observed which is then greater than the glass transition temperature. In this case, it is instead the melting point (M.p.) which makes it possible to choose the processing temperature for the polymer (or polymer block) under consideration. Thus, subsequently, when reference will be made to "Tg (or M.p., if appropriate)", it will be necessary to consider that this is the temperature used to choose the processing temperature.

For the requirements of the invention, the TPE elastomers comprise one or more thermoplastic block(s) preferably having a Tg (or M.p., if appropriate) of greater than or equal to 80° C. and formed from polymerized monomers. Preferably, this thermoplastic block has a Tg (or M.p., if appropriate) within a range varying from 80° C. to 250° C. Preferably, the Tg (or M.p., if appropriate) of this thermoplastic block is preferably from 80° C. to 200° C., more preferably from 80° C. to 180° C.

The proportion of the thermoplastic blocks, with respect to the TPE as defined for the implementation of the invention, is determined, on the one hand, by the thermoplasticity properties which the said copolymer has to exhibit. The thermoplastic blocks having a Tg (or M.p., if appropriate) of greater than or equal to 80° C. are preferably present in proportions sufficient to retain the thermoplastic nature of the elastomer according to the invention. The minimum content of thermoplastic blocks having a Tg (or M.p., if appropriate) of greater than or equal to 80° C. in the TPE can vary as a function of the conditions of use of the copolymer. On the other hand, the ability of the TPE to deform during the preparation of the tyre can also contribute to determining the proportion of the thermoplastic blocks having a Tg (or M.p., if appropriate) of greater than or equal to 80° C.

The thermoplastic blocks having a Tg (or M.p., if appropriate) of greater than or equal to 80° C. can be formed from polymerized monomers of various natures; in particular, they can constitute the following blocks or their mixtures:

polyolefins (polyethylene, polypropylene);
polyurethanes;
polyamides;
polyesters;
polyacetals;
polyethers (polyethylene oxide, polyphenylene ether);
polyphenylene sulphides;
polyfluorinated compounds (FEP, PFA, ETFE);
polystyrenes (described in detail below);
polycarbonates;
polysulphones;
polymethyl methacrylate;
polyetherimide;
thermoplastic copolymers, such as the acrylonitrile/butadiene/styrene (ABS) copolymer.

The thermoplastic blocks having a Tg (or M.p., if appropriate) of greater than or equal to 80° C. can also be obtained from monomers chosen from the following compounds and their mixtures:

acenaphthylene: a person skilled in the art may refer, for example, to the paper by Z. Fodor and J. P. Kennedy, Polymer Bulletin, 1992, 29(6), 697-705;

indene and its derivatives, such as, for example, 2-methylindene, 3-methylindene, 4-methylindene, dimethylindenes, 2-phenylindene, 3-phenylindene and 4-phenylindene; a person skilled in the art may, for example, refer to the patent document U.S. Pat. No. 4,946,899, by the inventors Kennedy, Puskas, Kaszas and Hager, and to the documents by J. E. Puskas, G. Kaszas, J. P. Kennedy and W. G. Hager, Journal of Polymer Science, Part A: Polymer Chemistry (1992), 30, 41, and J. P. Kennedy, N. Meguriya and B. Keszler, Macromolecules (1991), 24(25), 6572-6577;

isoprene, then resulting in the formation of a certain number of trans-1,4-polyisoprene units and of units cyclized according to an intramolecular process; a person skilled in the art may, for example, refer to the documents by G. Kaszas, J. E. Puskas and J. P. Kennedy, Applied Polymer Science (1990), 39(1), 119-144, and J. E. Puskas, G. Kaszas and J. P. Kennedy, Macromolecular Science, Chemistry A28 (1991), 65-80.

The polystyrenes are obtained from styrene monomers. Styrene monomer should be understood as meaning, in the present description, any monomer comprising styrene, unsubstituted and substituted; mention may be made, among substituted styrenes, for example, of methylstyrenes (for example, o-methylstyrene, m-methylstyrene or p-methyl styrene, α-methyl styrene, α,2-dim ethyl styrene, α,4-dim ethyl styrene or diphenylethylene), para-(tert-butyl)styrene, chlorostyrenes (for example, o-chlorostyrene, m-chlorostyrene, p-chlorostyrene, 2,4-dichlorostyrene, 2,6-dichlorostyrene or 2,4,6-trichlorostyrene), bromostyrenes (for example, o-bromostyrene, m-bromostyrene, p-bromostyrene, 2,4-dibromostyrene, 2,6-dibromostyrene or 2,4,6-tribromostyrene), fluorostyrenes (for example, o-fluorostyrene, m-fluorostyrene, p-fluorostyrene, 2,4-difluorostyrene, 2,6-difluorostyrene or 2,4,6-trifluorostyrene) or also para-hydroxystyrene.

According to a preferred embodiment of the invention, the content by weight of styrene in the TPE elastomer is between 5% and 50%. Below the minimum indicated, there is a risk of the thermoplastic nature of the elastomer being substantially reduced while, above the recommended maximum, the elasticity of the underlayer can be affected. For these reasons, the styrene content is more preferably between 10% and 40%.

According to an alternative form of the invention, the polymerized monomer as defined above can be copolymerized with at least one other monomer, so as to form a thermoplastic block having a Tg (or M.p., if appropriate) as defined above.

By way of illustration, this other monomer capable of copolymerizing with the polymerized monomer can be chosen from diene monomers, more particularly conjugated diene monomers having from 4 to 14 carbon atoms, and monomers of vinylaromatic type having from 8 to 20 carbon atoms, such as defined in the part relating to the elastomer block.

According to the invention, the thermoplastic blocks of the TPE exhibit, in total, a number-average molecular weight ("Mn") ranging from 5000 g/mol to 150 000 g/mol, so as to confer, on the TPE, good elastomeric properties and a mechanical strength which is sufficient and compatible with the use as tyre underlayer.

The thermoplastic block can also be composed of several thermoplastic blocks as defined above.

1.1.4. TPE Examples

For example, the TPE is a copolymer, the elastomer part of which is saturated and which comprises styrene blocks and alkylene blocks. The alkylene blocks are preferably of ethylene, propylene or butylene. More preferably, this TPE elastomer is selected from the following group consisting of diblock or triblock copolymers which are linear or star-branched: styrene/ethyl ene/butylene (SEB), styrene/ethylene/propylene (SEP), styrene/ethylene/ethylene/propylene (SEEP), styrene/ethylene/butylene/styrene (SEBS), styrene/ethylene/propylene/styrene (SEPS), styrene/ethylene/ethylene/propylene/styrene (SEEPS), styrene/isobutylene (SIB), styrene/isobutylene/styrene (SIBS) and the mixtures of these copolymers.

According to another example, the TPE is a copolymer, the elastomer part of which is unsaturated and which comprises styrene blocks and diene blocks, these diene blocks being in particular isoprene or butadiene blocks. More preferably, this TPE elastomer is selected from the following group consisting of diblock or triblock copolymers which are linear or star-branched: styrene/butadiene (SB), styrene/isoprene (SI), styrene/butadiene/isoprene (SBI), styrene/butadiene/styrene (SBS), styrene/isoprene/styrene (SIS), styrene/butadiene/isoprene/styrene (SBIS) and the mixtures of these copolymers.

For example again, the TPE is a linear or star-branched copolymer, the elastomer part of which comprises a saturated part and an unsaturated part, such as, for example, styrene/butadiene/butylene (SBB), styrene/butadiene/butylene/styrene (SBBS) or a mixture of these copolymers.

Mention may be made, among multiblock TPEs, of the copolymers comprising random copolymer blocks of ethylene and propylene/polypropylene, polybutadiene/polyurethane (TPU), polyether/polyester (COPE) or polyether/polyamide (PEBA).

It is also possible for the TPEs given as example above to be mixed with one another within the underlayer according to the invention.

Mention may be made, as examples of commercially available TPE elastomers, of the elastomers of SEPS, SEEPS or SEBS type sold by Kraton under the Kraton G name (e.g., G1650, G1651, G1654 and G1730 products) or Kuraray under the Septon name (e.g., Septon 2007, Septon 4033 or Septon 8004), or the elastomers of SIS type sold by Kuraray under the name Hybrar 5125 or sold by Kraton under the name D1161, or also the elastomers of linear SBS type sold by Polimeri Europa under the name Europrene SOLT 166 or of star-branched SBS type sold by Kraton under the name D1184. Mention may also be made of the elastomers sold by Dexco Polymers under the Vector name (e.g., Vector 4114 or Vector 8508). Mention may be made, among multiblock TPEs, of the Vistamaxx TPE sold by Exxon; the COPE TPE sold by DSM under the Arnitel name or by DuPont under the Hytrel name or by Ticona under the Riteflex name; the PEBA TPE sold by Arkema under the PEBAX name; or the TPU TPE sold by Sartomer under the name TPU 7840 or by BASF under the Elastogran name.

1.1.5. TPE Amount

If optional other (non-thermoplastic) elastomers are used in the composition, the thermoplastic elastomer or elastomers (TPE) constitute the predominant fraction by weight; they then represent at least 65% by weight, preferably at least 70% by weight and more preferably at least 75% by weight of the combined elastomers present in the elastomer composition. Preferably again, the TPE elastomer or elastomers represent at least 95% (in particular 100%) by weight of the combined elastomers present in the elastomer composition.

Thus, the total amount of TPE elastomer is within a range which varies from 65 to 100 phr, preferably from 70 to 100 phr and in particular from 75 to 100 phr. Preferably again, the composition comprises from 95 to 100 phr of TPE elastomer. The TPE elastomer or elastomers are preferably the only elastomer or elastomers of the underlayer.

1.2. Non-Thermoplastic Elastomer

The thermoplastic elastomer or elastomers described above are sufficient by themselves alone for the underlayer according to the invention to be usable.

The composition of the underlayer according to the invention can comprise at least one (that is to say, one or more) diene rubber as non-thermoplastic elastomer, it being possible for this diene rubber to be used alone or as a blend with at least one (that is to say, one or more) other non-thermoplastic rubber or elastomer.

The total content of optional non-thermoplastic elastomer is within a range varying from 0 to 35 phr, preferably from 0 to 30 phr, more preferably from 0 to 25 phr and more preferably still from 0 to 5 phr. Preferably again, the underlayer of the tyre according to the invention does not comprise a non-thermoplastic elastomer.

"Diene" elastomer or rubber should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

These diene elastomers can be classified into two categories: "essentially unsaturated" or "essentially saturated".

"Essentially unsaturated" is generally understood to mean a diene elastomer resulting at least in part from conjugated diene monomers having a content of units of diene origin (conjugated dienes) which is greater than 15% (mol %). In the category of "essentially unsaturated" diene elastomers, a "highly unsaturated" diene elastomer is intended in particular to mean a diene elastomer having a content of units of diene origin (conjugated dienes) which is greater than 50%.

Thus it is that diene elastomers such as some butyl rubbers or copolymers of dienes and of α-olefins of EPDM type can be described as "essentially saturated" diene elastomers (low or very low content of units of diene origin, always less than 15%).

Given these definitions, diene elastomer, whatever the above category, capable of being used in the compositions in accordance with the invention is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d)—a copolymer of isobutene and of isoprene (diene butyl rubber) and also the halogenated versions, in particular chlorinated or brominated versions, of this type of copolymer.

Any type of diene elastomer can be used in the invention. When the composition comprises a vulcanization system, use is preferably made of essentially unsaturated elastomers, in particular of the (a) and (b) types above, in the manufacture of the underlayer of the tyre according to the present invention.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be prepared in dispersion or in solution; they can be coupled and/or star-branched or else functionalized with a coupling and/or star-branching or functionalization agent. For coupling to carbon black, mention may be made, for example, of functional groups comprising a C—Sn bond or aminated functional groups, such as benzophenone, for example; for coupling to a reinforcing inorganic filler, such as silica, mention may be made, for example, of silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973). Mention may also be made, as other examples of functionalized elastomers, of elastomers (such as SBR, BR, NR or IR) of the epoxidized type.

1.3. Polyether-Based Thermoplastic Polymer

The underlayer described above can optionally comprise, in addition to constituents presented above, one or more polyether-based thermoplastic polymers. When they are present in the composition, it is preferable for the total content of polyether-based thermoplastic polymers to be less than 40 phr, preferably between 2 and 35 phr, more preferably between 5 and 30 phr and very preferably between 10 and 25 phr. These thermoplastic polymers can in particular be poly(para-phenylene ether) polymers (denoted by the abbreviation "PPE"). These PPE thermoplastic polymers are well known to a person skilled in the art; they are resins which are solid at ambient temperature (20° C.) and which are compatible with styrene polymers, which have in particular been used to increase the Tg of TPE elastomers, the thermoplastic block of which is a styrene block (see, for example, "*Thermal, Mechanical and Morphological Analyses of Poly(2,6-dimethyl-1,4-phenylene oxide)/Styrene-Butadiene-Styrene Blends*", Tucker, Barlow and Paul, Macromolecules, 1988, 21, 1678-1685).

1.4. Nanometric or Reinforcing Filler

The thermoplastic elastomer described above is sufficient by itself alone for the underlayer according to the invention to be usable; nevertheless, a reinforcing filler can be used in the composition.

When a reinforcing filler is used, use may be made of any type of filler commonly used for the manufacture of tyres, for example an organic filler, such as carbon black, an inorganic filler, such as silica, or else a blend of these two types of filler, in particular a blend of carbon black and silica.

When a reinforcing inorganic filler is used, it is possible, for example, to use, in a known way, an at least bifunctional coupling agent (or bonding agent) intended to provide a satisfactory connection, of chemical and/or physical nature, between the inorganic filler (surface of its particles) and the elastomer, in particular bifunctional organosilanes or polyorganosiloxanes.

1.5. Various Additives

The underlayer described above can furthermore comprise the various additives normally present in the underlayers known to a person skilled in the art. The choice will be made, for example, of one or more additives chosen from protection agents, such as antioxidants or antiozonants, UV stabilizers, the various processing aids or other stabilizers, or also promoters capable of promoting the adhesion to the remainder of the structure of the tyre. Preferably, the underlayer does not comprise all these additives at the same time and, more preferably still, the underlayer does not comprise any of these agents.

Equally and optionally, the composition of the underlayer of the invention can comprise a crosslinking system known to a person skilled in the art. Preferably, the composition does not comprise a crosslinking system. In the same way, the composition of the underlayer of the invention can comprise one or more inert micrometric fillers, such as lamellar fillers, known to a person skilled in the art. Preferably, the composition does not comprise a micrometric filler.

Optionally again, the composition of the underlayer of the invention can comprise a plasticizing agent, such as an extending oil (or plasticizing oil) or a plasticizing resin, the role of which is to facilitate the processing of the underlayer, in particular its incorporation in the tyre, by a lowering of the modulus and an increase in the tackifying power. When the composition comprises it, it is preferable for the content of plasticizer to vary from 0 to 80 phr, more preferably from 0 to 50 phr, more preferably still from 0 to 30 phr, and in particular less than 10 phr, according to the Tg and the modulus which are targeted for the underlayer. According to a preferred alternative form of the invention, the composition of the underlayer does not comprise a plasticizer.

In addition to the elastomers described above, the composition of the underlayer can also comprise, always according to a minor fraction by weight with respect to the block elastomer, thermoplastic polymers other than those based on polyether. It is preferable for the composition not to comprise such thermoplastic polymers other than those based on polyether or, when they are present in the composition, it is preferable for the total content of thermoplastic polymers other than those based on polyether to be less than 30 phr, preferably less than 10 phr. Very preferably, the composition is devoid of such thermoplastic polymers other than those based on polyethers or comprises less than 5 phr thereof.

2. Preparation of the Underlayer and of the Tyre According to the Invention

The TPE elastomers can be processed in the usual way for TPEs, by extrusion or moulding, for example using a starting material available in the form of beads or granules.

The underlayer for the tyre according to the invention is prepared in the usual way, for example by incorporation of the various components in a twin-screw extruder, so as to carry out the melting of the matrix and the incorporation of all the ingredients, followed by use of a die which makes it possible to produce the profiled element.

This underlayer can be fitted to a tyre in the usual way, the said tyre comprising, in addition to the underlayer necessary for the requirements of the invention, a tread, a crown and a crown reinforcement, and preferably two sidewalls and two beads, and a carcass reinforcement anchored to the two beads and extending from one sidewall to the other.

It should be remembered that, in the tyre according to the invention, the possibility of facilitated tread separation is represented by the difference between the ratio of elastic modulus at 200° C. and at 60° C. of the underlayer and that of the adjacent layers, when the following equation is adhered to with each of the adjacent layers:

$$GA('200° C.) \times GA('60° C.) \times GB('200° C.) \times GB('60° C.) \leq 0.6$$

in which GA'T represents the elastic component of the shear modulus of the underlayer at the temperature T, and GB'T represents the elastic component of the shear modulus of the layer adjacent to the underlayer at the temperature T. This is because, when this equation is adhered to, it is understood that the underlayer will soften much more before 200° C. than the adjacent layer, which is an important condition for a facilitated tread separation.

Preferably, the difference between the ratio of elastic modulus at 200° C. and at 60° C. of the underlayer and that of the adjacent layers is such that the following equation is adhered to:

$$GA('200° C.) \times GA('60° C.) \times GB('200° C.) \times GB('60° C.) \leq 0.5$$

and, more preferably, the difference between the ratio of elastic modulus at 200° C. and at 60° C. of the underlayer and that of the adjacent layers is such that the following equation is adhered to:

$$GA('200° C.) \times GA('60° C.) \times GB('200° C.) \times GB('60° C.) \leq 0.45$$

According to the tyre applications targeted, it can be preferable for the underlayer to have elastic modulus properties such that the following equation is adhered to:

$$GA('100° C.) \times GA('60° C.) > 0.4$$

This is because a slight elastic modulus variation between 60° C. and 100° C. is a good indicator of the fact that the underlayer has not excessively softened at these temperatures, which is desirable for the satisfactory operation of the tyre, in particular if it is intended for tyres of passenger vehicles or heavy-duty vehicles, which have an operating temperature exceeding the values of 60° C.

Preferably, the underlayer has elastic modulus properties such that the following equation is adhered to:

$$GA('100° C.) \times GA('60° C.) > 0.5$$

Preferably, the underlayer has elastic modulus properties such that the following equation is adhered to:

$$GA('100° C.) \times GA('60° C.) > 0.6$$

Preferably, the underlayer has elastic modulus properties such that the following equation is adhered to:

$$GA('100° C.) \times GA('60° C.) > 0.7$$

The layers adjacent to the tread underlayer are typically the tread, on the one hand, and the belt (or crown reinforcement) of the tyre, on the other hand.

In the case where the tread underlayer is located inside the original tread, it is understood that the two adjacent layers are, on the one hand, the upper part of the tread (radially outer, forming the subject of the tread separation) and, on the other hand, the lower part (radially inner with respect to the underlayer) of the original tread. In this case, it is possible for the two adjacent layers of the underlayer to be identical or different in nature.

Whatever the chemical nature of the adjacent layers, the equation presented above has to be adhered to in order for the invention to operate correctly.

According to a preferred embodiment, the adjacent layers can be composed of compositions based on diene elastomers well-known to a person skilled in the art, such as those defined above as optional complementary elastomers of the thermoplastic elastomers of the underlayer.

Such adjacent layers are described in numerous patents well-known to a person skilled in the art and generally comprise, in addition to the diene elastomers described above, additives such as those described above for the composition of the underlayer and in particular reinforcing fillers, such as silica and/or carbon black, plasticizers in the form of plasticizing oil or plasticizing resin, a crosslinking system and other additives well-known to a person skilled in the art, such as antioxidants.

According to another preferred embodiment, the adjacent layers can also be composed of compositions based on thermoplastic elastomers or comprising thermoplastic elastomers, and in particular this can be the case of the tread.

According to yet another preferred embodiment, one of the adjacent layers can be a layer composed of a composition based on diene elastomer (in particular the tyre belt), whereas the other adjacent layer can be composed of a composition based on thermoplastic elastomer (in particular the tread).

Alternatively, the possibility of facilitated tread separation is also represented by the difference between the variation in elastic modulus between 60° C. and 200° C. of the underlayer and that of the adjacent layers, when the following equation is adhered to with each of the adjacent layers:

$$EA('200° C.) \times EA('60° C.) \times EB('60° C.) \leq 0.6$$

in which $E'A(T)$ GA'T represents the elastic component of the shear modulus of the underlayer at the temperature T and $E'_B(T)$ GB'T represents the elastic component of the shear modulus of the layer adjacent to the underlayer at the temperature T. In this case, the E'(T) modulus is measured in compression.

Thus, the invention can be defined by replacing the equation comprising the ratios of G' moduli by the above equation comprising the ratios of E' moduli. The same embodiments can be envisaged and the preferences indicated above apply mutatis mutandis.

The invention claimed is:

1. A tire ring provided with a substantially central tread region comprising: a ring elastomer mixture having a radially inward supporting surface covered with a layer of thermoplastic elastomer, an inner face, an outer face, two sidewalls and bead regions, on each side of the tread region,
    wherein the supporting surface extends from one bead region to another bead region while passing through the two sidewalls and the tread region,
    wherein an interface between the thermoplastic elastomer of the thermoplastic elastomer layer and the ring elastomer mixture is co-crosslinked, without the thermoplastic elastomer layer being crosslinked throughout its body, and
    wherein the tire ring is obtained by joint molding and vulcanization of the ring elastomer mixture which comprises crosslinking agents and the thermoplastic elastomer layer which is devoid of crosslinking agents.

2. The tire ring according to claim 1, wherein the layer of thermoplastic elastomer is covered with a removable protective membrane.

3. The tire ring according to claim 1, wherein the layer of thermoplastic elastomer consists of styrene/butadiene/styrene or styrene/butadiene/styrene/poly(para-phenylene ether).

4. The tire ring according to claim 1, wherein the layer of thermoplastic elastomer comprises a thickness of between 10 μm and 1 mm.

5. The tire ring according to claim 4, wherein the layer of thermoplastic elastomer comprises a thickness of between 10 μm and 200 μm.

6. The tire ring according to claim 5, wherein the layer of thermoplastic elastomer comprises a thickness of between 10 μm and 80 μm.

* * * * *